United States Patent [19]

Mayer et al.

[11] 3,967,280
[45] June 29, 1976

[54] DIRECTION FINDING SYSTEM WITH INTEGRATED LOOP AND SENSE ANTENNA ASSEMBLY

[75] Inventors: Abbott F. Mayer, Marion; David J. Morgan, Cedar Rapids, both of Iowa

[73] Assignee: Rockwell International Corporation, El Segundo, Calif.

[22] Filed: Jan. 27, 1975

[21] Appl. No.: 544,440

[52] U.S. Cl. .............................. 343/121; 343/120
[51] Int. Cl.² ............................................ G01S 3/16
[58] Field of Search ............................ 343/121, 120

[56] References Cited
UNITED STATES PATENTS

| | | | |
|---|---|---|---|
| 2,943,323 | 6/1960 | Ryan | 343/121 |
| 3,150,364 | 9/1964 | Green | 343/120 |
| 3,435,455 | 3/1969 | Yello | 343/120 |

*Primary Examiner*—Maynard R. Wilbur
*Assistant Examiner*—Richard E. Berger
*Attorney, Agent, or Firm*—Richard W. Anderson; Robert J. Crawford

[57] ABSTRACT

An automatic radio direction finding system employing an integrated antenna unit containing both sense and loop antennas in a single compact enclosure. Signal processing circuitries by means of which a low-frequency switching modulation is imposed on one of the antennas, as well as broad-band R-F preamplification and signal combining circuitry for the antenna outputs, are accomplished within the unit. The combining circuit output in the antenna unit, and the remote receiver input, have impedances matching that of a standard coaxial cable interconnect, such that the voltage dividing action effected by conventional antenna cable interconnect means is removed, permitting a small sense antenna of considerably less $H_eC_a$ product to provide necessary sensitivity. Critical antenna cable length requirements, with attendant installation difficulties, are obviated, and the antenna unit may be mounted on a wide variety of aircraft including those having physical size and performance characteristics which have heretofore precluded satisfactory ADF system installations.

9 Claims, 12 Drawing Figures

DIRECTION FINDING SYSTEM WITH INTEGRATED LOOP AND SENSE ANTENNA ASSEMBLY

This invention relates generally to automatic direction finding systems and more particularly to an improved system with an integral loop and sensing antenna assembly, including the loop and sense antennas along with the signal processing and combining circuitries associated with these antennas.

Conventional automatic direction finder systems in use in aircraft today generally employ an omnidirectional sense antenna to supply a constant phase reference signal to resolve the ambiguity inherent in bearings obtained using the "figure-of-eight" radiation pattern produced by combining the outputs of two quadrantally oriented loop antenna elements. The conventional loop antenna assembly consists of either a high permeability block of ferrite material with two separate coils wound thereon in the lateral and longitudinal directions or, alternatively, separate ferrite-cored loops mounted such that their respective nulls occur in the lateral and longitudinal directions, resulting in a relatively small, streamlined unit which, itself, is quite easily installed on all aircraft.

The remotely located sense antenna, as employed in current systems, is generally defined by one of three configurations; a vertical whip, an inverted Tee or "L" wire antenna or a flush-mounted cavity type antenna. Omnidirectional sense antennas of the whip configuration must be in the order of ½ to 1 meter in height. The inverted Tee or "L" antenna is customarily 10 to 18 inches high and 10 to 20 feet long. Flush-mounted antennas currently in commercial usage require 2,000 to 6,000 square inches of surface area. Thus each of the currently employed sensing antennas presents very serious physical installation problems in their application to the various sizes and aerodynamic performance levels of modern aircraft.

The whip antenna is not aerodynamically suitable for turboprop aircraft and turbojet aircraft. While the whip antenna may be installed on single engine or small twin-engine reciprocating engine aircraft, this type of antenna is subject to physical damage in aircraft handling and interferes with the location of other antennas.

The currently employed inverted Tee antenna has a physical length requirement which is too long for mounting on small aircraft, necessitates rigid construction on turboprop or turbojet aircraft, and often is extremely difficult to install in dual automatic direction finding installations.

The surface area required for the flush-mounted sense antenna, as currently employed in the ADF art, precludes the use of such an antenna on aircraft smaller than twin engine commercial aircraft, and further requires that the antenna be designed into the airframe at the time the aircraft is designed.

In automatic direction finding systems as currently employed in the art, the radio frequency signal outputs from the loop antenna and that from the sense antenna are connected by coaxial cables to a remotely installed automatic direction finder receiver unit where they are combined and processed to provide the directional information. The loop and sense coaxial cables by means of which these RF signals are conducted to the receiver unit, present additional installation problems because they inherently become a part of the antenna matching and tuning circuits and, as such, they must have a specified impedance and electrical length which limits the length of cable that may be installed, or, alternatively, necessitate that one or the other of a predetermined choice of fixed-length cables be installed between the antenna and receiver unit.

When flush-mounted sense antennas are employed, a special antenna coupler must be designed for each different antenna capacitance, thus further creating a serious installation limitation as concerns the type of flush antenna to be employed and the aircraft in which the system is to be installed.

Present ADF systems are often difficult to achieve satisfactorily in business aviation aircraft, particularly in executive jet aircraft. The state-of-the-art towel-rail antennas or whip antennas, which can be satisfactorily installed on lowspeed aircraft, are unsatisfactory on the jets because of excessive drag and cosmetic effect. Further, the smaller jets do not offer enough surface area for satisfactory flush-mounted sense antennas. While semi-flush loop antennas are practical, the loop cables and quadrantal error correctors necessarily associated therewith are often problem sources because they have to be specially constructed to provide pressure bulkhead feedthroughs at precise cable lengths and do not always have sufficient "head room."

Thus, while radio direction finding systems for aircraft have been developed to a high point of sophistication, and present no particular problems when installed on large commercial aircraft, they present a variety of problems, sometimes insurmountable, when installation on smaller aircraft is contemplated, particularly on high performance smaller aircraft.

Since the manufacturer of automatic direction finding systems provides an ADF receiver and loop antenna together with loop connecting cables of specified precise length, the manufacturer, due to a variety of sensing antennas which either may be, or must be, associated with a particular installation, has no control over field problems which result from unsatisfactory sense antenna means often provided by the installer. In many cases, a particular small aircraft cannot enjoy the benefits of an ADF system due to the above-defined antenna installation problems.

Accordingly, an object of the present invention is to overcome the aforementioned antenna installation difficulties by providing an ADF receiver system which includes a small compact antenna assembly including the loop and sense antennas in a single unitary assembly, along with such signal combining and processing electronic circuitries as are employed in the ADF art to modulate and combine the outputs of the sense and loop antenna means such that the resultant combined RF signal carries a modulation component or components definitive of the direction from which an incoming carrier signal is being received.

A further object of the present invention is to provide a small antenna assembly which includes the loop antenna and sense antenna associated with an automatic direction finding system, along with the signal combining and processing circuitries for received signals, such that the output impedance of the assembly is nominally the characteristic impedance of a coaxial cable, thereby obviating critical cable length and installation problems heretofore encountered.

A still further object of the present invention is to provide a small, compact, combination loop and sense antenna means along with automatic direction finding signal combining and processing circuitries and a sense antenna element having appreciably less effective height than those currently employed in the ADF art to obtain a desired sense antenna sensitivity.

Another object of the present invention is to provide a small, compact combination sense and loop-antenna means, including signal processing circuitries associated with the outputs from these antennas, whereby the processed and combined sense and loop antenna RF outputs may be connected to a remote receiver, for demodulation and intelligence recovery, by means of a conventional coaxial cable the length of which is not critical.

The present invention is featured in the provision of an automatic direction finding system having an integrated loop and sense antenna assembly including signal processing means associated with these antenna outputs, which, in effect, moves the broad-band front end of an ADF receiver to the antenna assembly, per se, so as to provide a single, small, easily installed antenna assembly which may be interconnected to a receiver through a coaxial cable terminated in its characteristic impedance, and which, by eliminating the voltage division caused by the cable capacitance in the state-of-the-art ADF installations, permits the use of a sense antenna of considerably less effective height and capacitance product, as compared to conventional systems.

These and other features and objects of the present invention will become apparent upon reading the following description with reference to the accompanying drawing in which.

Figures 8A, 8B:
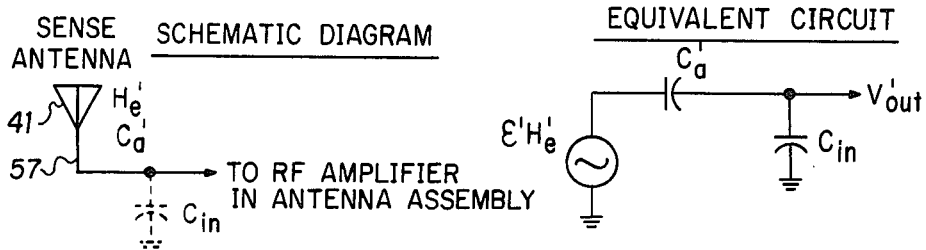
Figure 9:
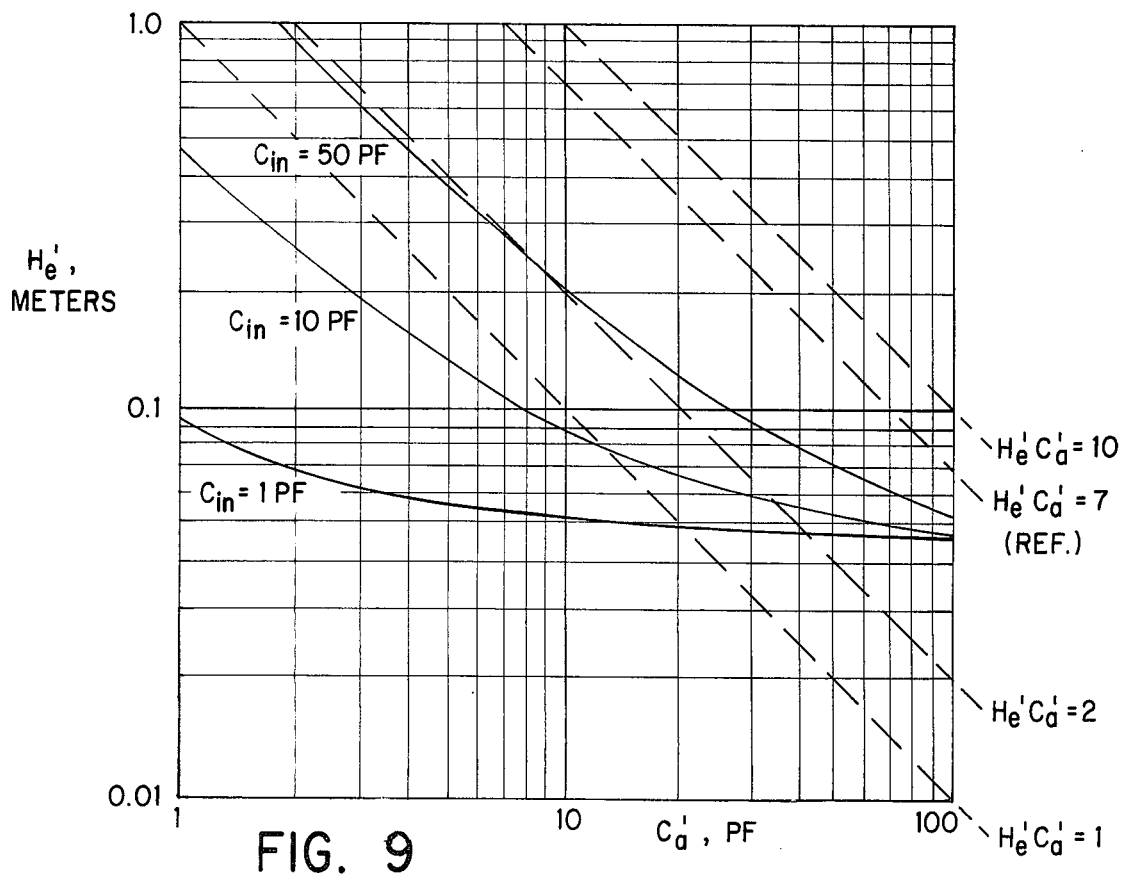

FIGS. 8A and 8B depict respective schematic and equivalent circuit diagrams of the sense antenna configuration as employed in the present invention; and FIG. 9 is a plot of sense antenna effective height and antenna capacitance requirements for a typical state-of-the-art system design as compared with the considerably lesser requirement to attain like sensitivity, as made possible by the teachings of the present invention.

Figure 1:
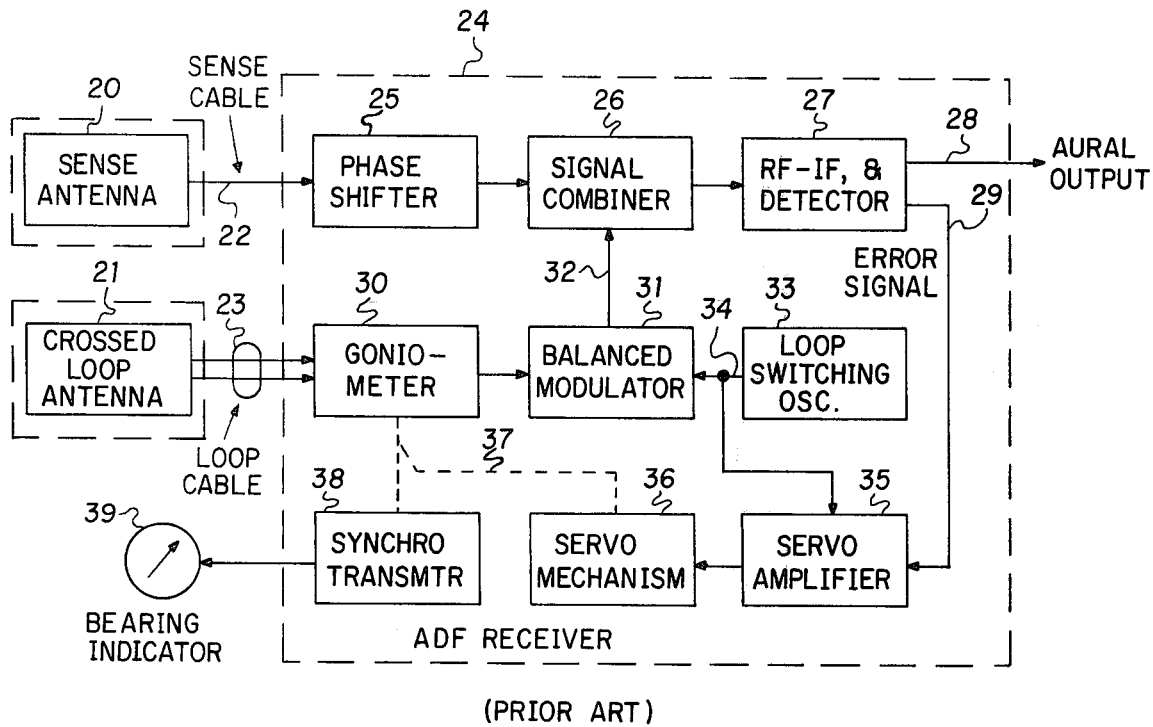
FIG. 1 is a functional block diagram of an exampled prior art automatic direction finding system.

FIG. 1 is a block diagram representative of a conventional prior art ADF system which employs a remotely located sense antenna 20 and a loop antenna 21, the respective outputs of which are carried by critical interconnecting cabling means 22 and 23 as inputs to a remotely installed ADF receiver 24. Cables 22 and 23 are conventionally separate coaxial, or shielded and twisted, antenna cables that provide a precise system-defined impedance and must be of precise, design defined, critical lengths. The signals from the two elements of the loop antenna 21 are combined in the receiver 24 in a radio frequency resolver (goniometer) 30. The output from goniometer 30 is modulated in balanced modulator 31 at a loop switching rate defined by a modulating signal input 34 from loop switching oscillator 33. The output 32 from the balanced modulator is combined with (added to) the output from the sense antenna in a signal combiner 26. The sense antenna output might, in a given system, be imparted with a 90° phase shift, as by phase shifter 25, prior to combination in combiner 26 with the output 32 from balanced modulator 31. The output signal from the combiner 26 is amplified and demodulated in the receiver RF-IF-detector circuits 27, providing an error signal 29. The error signal 29 is compared with the loop switching oscillator output 34 in a servo amplifier 35. The servo amplifier output actuates a servo mechanism 36 to mechanically rotate, by means of mechanical drive 37, the rotor of goniometer 30 to seek and find the null position of the goniometer rotor which represents the ADF bearing. The null position of the rotor of goniometer 30 is relayed to a bearing indicator 39 via a synchro transmitter 38 that is mechanically coupled to the goniometer by means of mechanical drive 37.

FIG. 1 is merely exemplary of prior art systems, and numerous variations from the system depicted in FIG. 1 are known. For example; the mechanical goniometer 30 of FIG. 1 might be replaced by a solid state capacitance goniometer employing varactors in a voltage divider, which is equivalent to a continuously rotating goniometer, and would produce a receiver output at the goniometer driving frequency whose phase, relative to the driving signal, is the radio bearing. A further scheme might employ a pair of balanced modulators in lieu of the single balanced modulator 31 of FIG. 1, by means of which the respective outputs from the two loop antenna elements are modulated by two non-related audio frequencies and the receiver demodulator output would consist of two audio tones whose relative amplitudes are related to the relative bearing in much the same manner as the currently employed instrument landing system localizer or glide scope receiver output is related to the instrument landing system course, such that the radio bearing could be recovered with solid-state circuitries. A third scheme might employ a pair of balanced modulators in lieu of the single balanced modulator 31 of FIG. 1 with the respective loop element outputs being balanced modulated by two audio signals of the same frequency, but in phase quadrature. The resultant detected signal from the receiver in such a system would be the audio tone, whose phase relationship with respect to the driving signal would be a function of the radio bearing, similar to the phase relationship of the VHF omnirange variable phase signal with respect to the VHF omnirange reference signal. Further variations on the prior art system as depicted in FIG. 1 are also known. For example, the outputs of the loop antenna elements might be commutated sequentially with a prescribed commutating signal, and the detected signal, which would be a series of step functions, filtered to regain the fundamental frequency, whose phase relationship with respect to the driving signal would contain the radio bearing information.

Each of the systems as depicted in FIG. 1 and briefly defined in the above-discussed variations, employ some means to modulate the loop antenna output by a low frequency switching signal, or signals, with subsequent combination of the modulated loop signal with the sense antenna signal to provide a composite signal carrying modulation intelligence related to the bearing of the received signal. Each of the state-of-the-art signal processing schemes for recovering bearing information from the respective outputs of a sense and loop antenna means, performs the modulation at a low frequency rate in the remote receiver unit, that is, the processing of the output of the sense and loop antennas is carried out in the remote receiver, with the outputs from the antennas, per se, being individually carried to the remote receiver via cabling means.

Figure 7A:
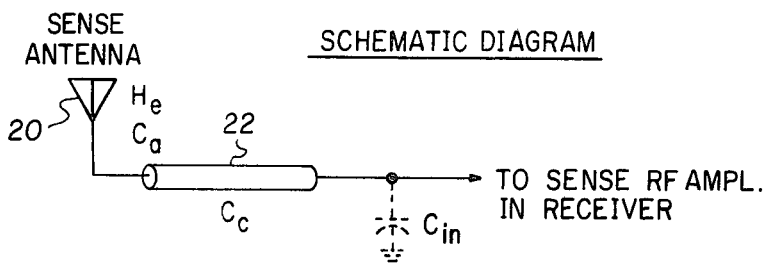
FIGS. 7A and 7B depict respective schematic and equivalent circuit diagrams of sense antenna configurations currently employed in the ADF art.

As such, the prior art systems impose sense antenna effective height, $H_e$, and capacitance limitations that are a function of the interconnecting cable capacitance, $C_c$, and receiver capacitance design center, $C_a + C_c$, as depicted in FIG. 7A. Since the automatic direction finder is usually noise limited by the receiver, its sensitivity is proportional to the signal voltage that is delivered to the receiver input circuit. The signal voltage at the receiver input circuit, for a given design center capacitance, is proportional to the antenna effective height and capacitance product, $H_eC_a$.

It may be shown that the same signal voltage can be delivered to the receiver input circuit with a significant reduction in the required antenna capacitance, if the receiver input circuit is moved to the antenna, thus eliminating the voltage division caused by the interconnecting cable capacitance. Thus, the same sensitivity can be achieved without the requirement for a large sense antenna, allowing the sense antenna to be integrated with the loop antenna in a single, compact assembly.

Figure 7B:
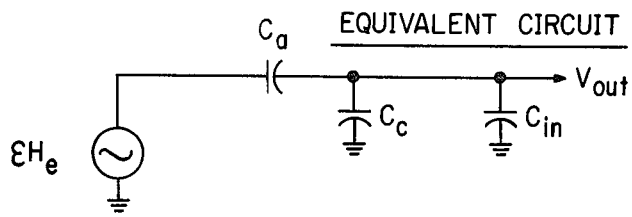

With reference to FIG. 7A, the ADF sense antenna as employed currently in the art is represented schematically as a sense antenna element 20, the output of which is carried through an interconnecting cable 22 which is terminated by a receiver input capacitance, $C_{in}$. The equivalent circuit for the sense antenna diagram of FIG. 7A is depicted in FIG. 7B where:

$\epsilon$ = Impinging Field Strength, Volts/Meter
$H_e$ = Antenna Effective Height, Meters
$C_a$ = Antenna Capacitance, pf.
$C_c$ = Cable Capacitance, pf.
$C_{in}$ = Receiver Input Capacitance $$V_{out} = \epsilon H_e \frac{C_a}{C_a + C_c + C_{in}}$$

$C_a + C_c + C_{in} = C_{Design\ Center}$ for a given design and is therefore constant. A typical design for a system currently used in the art might then require a minimum $H_eC_a$ of 7 pf. meters when $C_a + C_c = 150$ pf., with typical values: $H_e = 0.1$ m, $C_a = 70$ pf., and $C_c = 80$ pf.

FIG. 8A represents the sense antenna schematic in accordance with the present invention, wherein the sense antenna cable 22 is eliminated and the schematic is comprised of a sense antenna 41 of effective height $H_e'$ and capacitance $C_a'$, along with interconnection 57 and receiver input capacitance, $C_{in}$.

FIG. 8B represents the equivalent circuit for the sense antenna schematic depicted in FIG. 8A. The output $V_{out}$ in FIG. 8B is therefore expressed as:

$$V'_{out} = \frac{\epsilon H_e' C_a'}{C_a' + C_{in}}$$

then, for the same sensitivity as exampled, $V'_{out} = V_{out}$, and $$\frac{\epsilon H_e' C_a'}{C_a' + C_{in}} = \frac{\epsilon H_e C_a}{C_a + C_c + C_{in}}$$

$$H_e' C_a' = (H_e C_a) \frac{C_a' + C_{in}}{(C_a + C_c) + C_{in}}$$

$$= \frac{(7)(C_a' + C_{in})}{150 + C_{in}}$$

$$H_e' = \frac{7(C_a' + C_{in})}{C_a'(150 + C_{in})}$$

This equation, as plotted in FIG. 9, shows the reduction in $H_eC_a$ that can be achieved by eliminating the sense antenna cable.

EXAMPLE:

if $C_{in} = 10$pf and $H_e' = 0.1$m $C_a' = 7.6$pf $H_e'C_a' = 0.76$, compared to 7.0 required for the above exampled state-of-the-art system, where the cable capacitance $C_a$ required the significantly higher $H_eC_a$ product.

Figure 3:
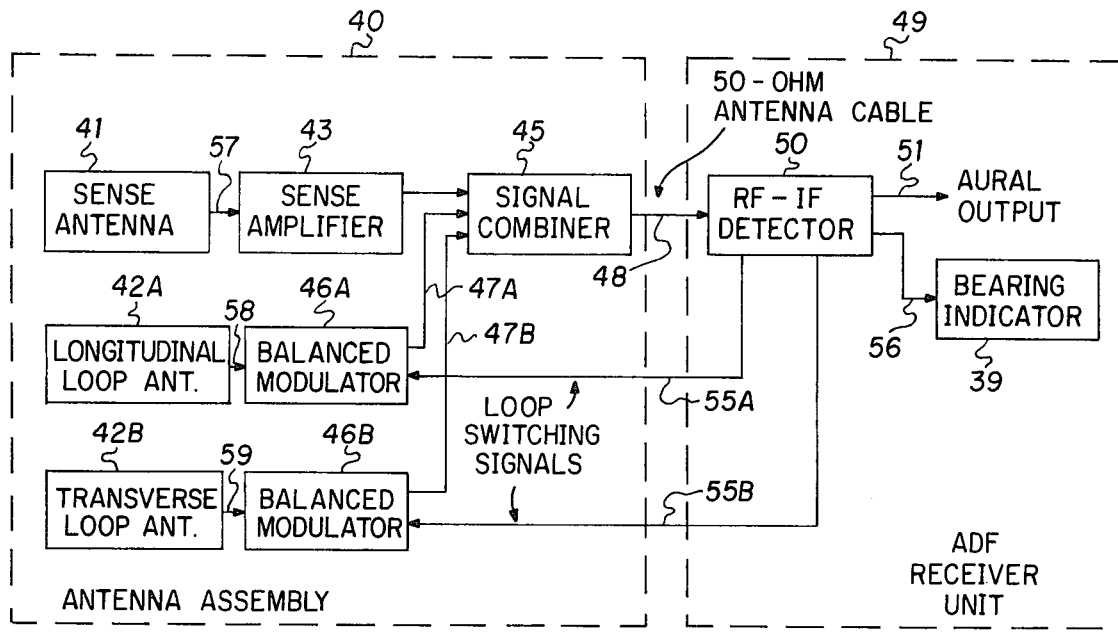
FIG. 3 is a functional block diagram of a preferred embodiment of an improved ADF system including the antenna assembly of the present invention.

FIG. 3 represents a general block diagram of an ADF system with integrated antenna assembly in accordance with the present invention, wherein the outputs of each of the longitudinal and transverse loop antenna elements 42A and 42B are switched by means of balanced modulators 46A and 46B under the control of low-frequency loop switching signals 55A and 55B, generated in the remote receiver unit 49. The outputs 47A and 47B from the balanced modulators 46A and 46B are applied, along with the sense antenna signal, to a signal combiner 45. Sense antenna 41 is illustrated as applying a signal 57 to a sense amplifying means 43, the output of which is combined with the balanced modulator outputs 47A and 47B in signal combiner 45. In accordance with the present invention, the loop antenna modulation, and the subsequent combination of the balanced modulator outputs with the sense antenna signal, is accomplished in the antenna assembly. The three signals from the sense antenna and the two balanced modulators are combined (added) in the signal combiner 45, with the combiner 45 designed for a nominal output impedance which matches the characteristic impedance of the coaxial cable 48 which carries the output from combiner 45 to the remote ADF receiver unit 49. The two loop switching signals 55A and 55B are generated in, and provided from, the associated remote receiver unit 49. As a preferred embodiment, and not by way of limitation, the loop switching signals 55A and 55B of FIG. 3 might be of the same frequency, $f_m$, and in respective phase quadrature. That is, loop switching signal 55A might be expressed as $E_m\cos\omega_m t$, and loop switching signal 55B might be expressed as $E_m\sin\omega_m t$. Then, defining the sense antenna signal 57 as $e_s = E_s\sin\omega_c t$, the transverse loop antenna output 59 as $e_t = E_1\cos\theta\cos\omega_c t$, and the longitudinal loop antenna output 58 as $e_{lg} = E_1\sin\theta\cos\omega_c t$, the output of balanced modulator 46A is defined as $e_{01} = E_1E_m$-

$\cos\omega_c t \cos\theta \cos\omega_m t$ and that of balanced modulator 46B is defined as $e_{02} = E_1 E_m \cos\omega_c t \sin\theta \sin\omega_m t$. The addition of the sense antenna output $e_s$ and the balanced modulator outputs $e_{01}$ and $e_{02}$ in signal combiner 45 defines an output signal from signal combiner 45 expressed as $e_{out} = E_s \sin\omega_c t + E_1 E_m \cos\omega_c t \cos(\omega_m t\ \theta)$. Combiner 45 output ($e_{out}$) is then seen to be a sinusoidal signal at the received signal frequency, $E_s \sin\omega_c t$, phase modulated at the loop switching frequency by the vectorial addition of $+ E_1 E_m \cos\omega_c t \cos(\omega_m t\ \theta)$ to the sense signal. The phase of this modulation, relative to the phase of the loop switching signal is seen to contain the factor $\theta$, which is the direction of arrival of the signal. Thus, the directional information to the station can be determined by receiver circuits that extract the phase of the modulation relative to the phase of the loop switching signal that is supplied by the receiver.

Figure 6A:
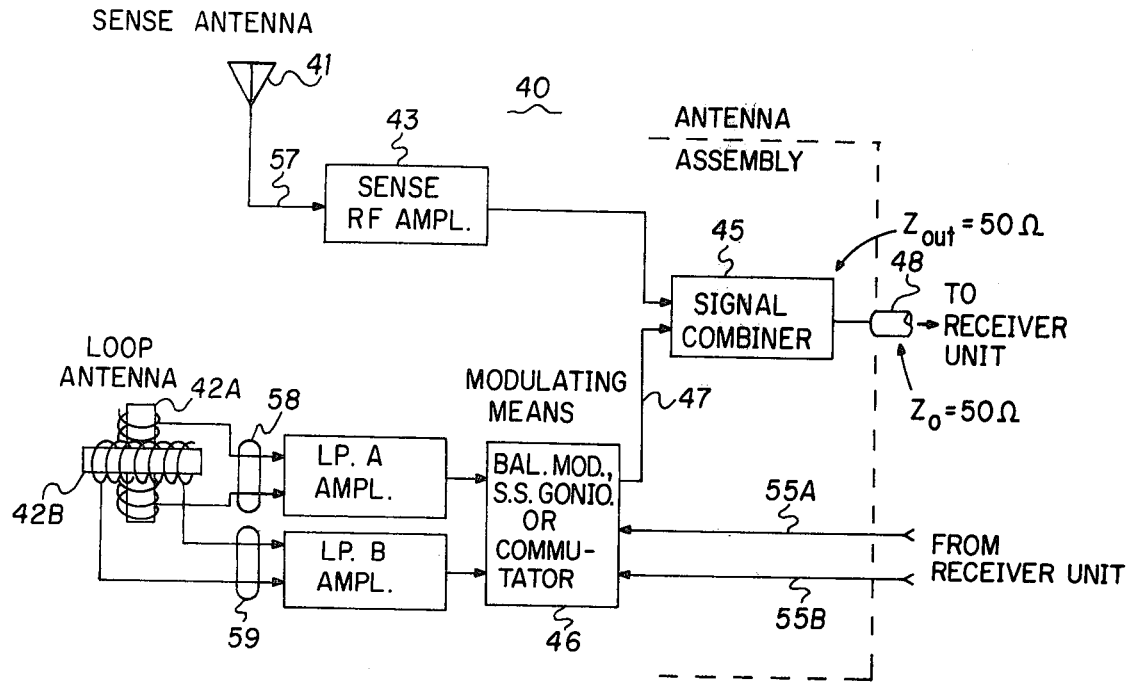
FIGS. 6A and 6B depict a more detailed functional block diagram of the preferred embodiment of the present invention.
Figure 6B:
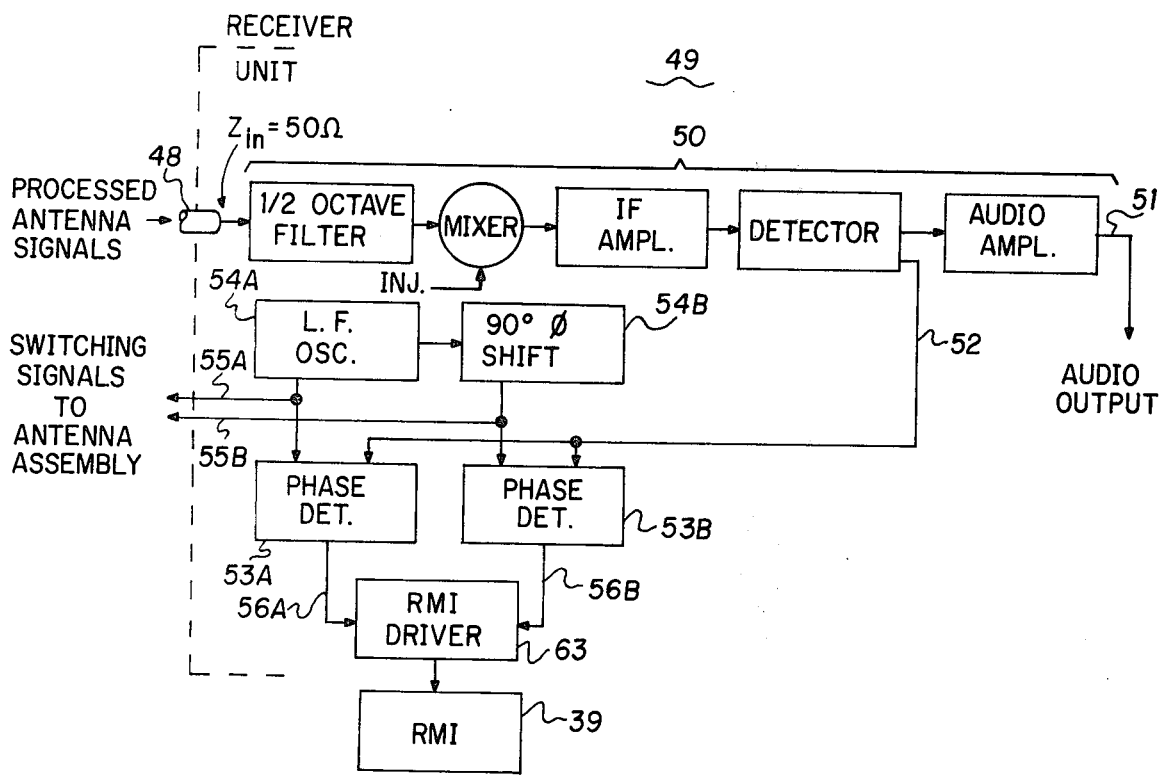

FIGS. 6A and 6B represent a more detailed functional diagram of a preferred embodiment in accordance with the present invention, wherein the antenna assembly 40 is depicted as including the loop antenna elements 42A and 42B, the sense antenna 41, the sense antenna RF amplifier 43 loop signal amplifiers, and the modulating means 46. The output from signal combiner 45 is carried through a 50-ohm coaxial cable 48 of uncritical length to the receiver unit 49.

The receiver unit 49 of FIG. 6B is depicted as including conventional receiver front-end circuitry 50 which demodulates the processed combined loop and sense antenna signal carried by cable 48. FIG. 6B depicts a low-frequency oscillator 54A and a 90° phase shifter 54B by means of which the respective quadrature low-frequency switching signals, 55A and 55B are generated. Further phase detectors 53A and 53B compare the output from the receiver front-end circuitry 50 against the respective switching signals 55A and 55B to recover quadrature signals 56A and 56B which are collectively definitive of the ADF bearing, $\theta$. These sine $\theta$ and cosine $\theta$ signals may be applied to an RMI driver 63 which might comprise a synchro transmitter or a solid state means to convert the quadrature input signals 56A and 56B to a bearing vector for display on an RMI indicator 39.

Figure 2:
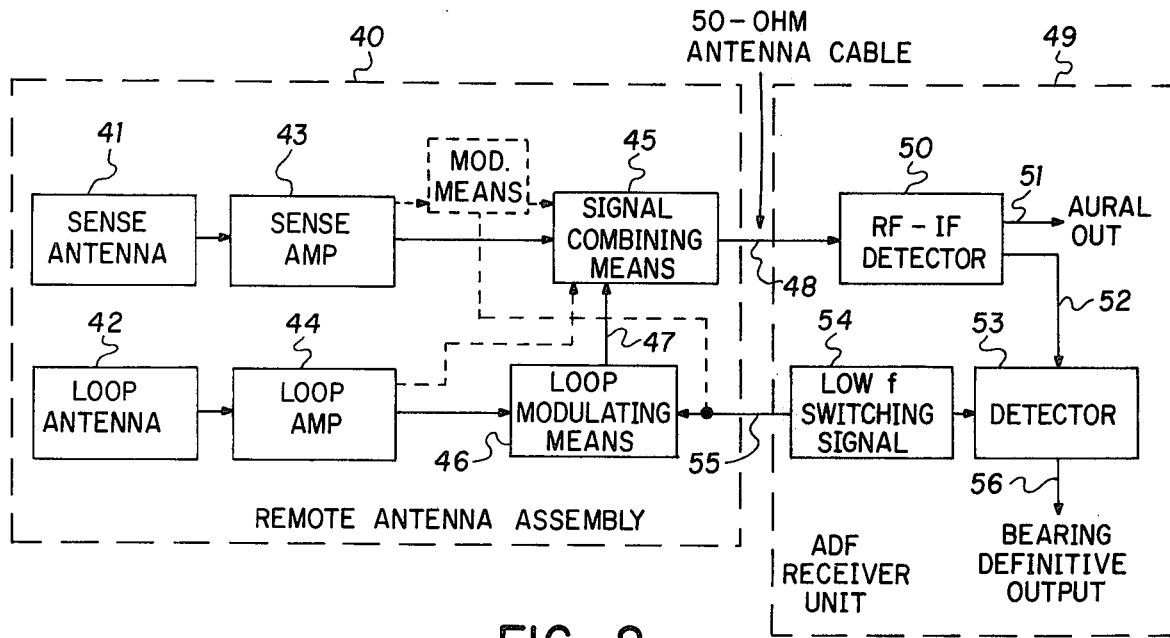
FIG. 2 is a functional block diagram of an improved automatic direction finding system, including the integrated sense and loop antenna assembly in accordance with the present invention.

As above described, various schemes exist in state-of-the-art automatic direction finding systems by means of which modulation at a low-frequency switching rate is imparted in some manner to the loop antenna output prior to its combination with the sense antenna output. It is to be emphasized that the present invention is not limited to any one particular means for so modulating the loop antenna output, nor is the present invention limited to modulation of the loop antenna output, as depicted herein, as opposed to the alternative of modulating the output of the sense antenna rather than the loop antenna prior to combination of the antenna signal outputs. It is known in the ADF art that to recover, without ambiguity, a signal from directional loop and omnidirectional sense antennas which is definitive of the bearing of the received signal, a low-frequency (audio) modulating signal may be used to switch the output of one or the other of these antennas at the low-frequency rate. Thus the general block diagram of FIG. 2 depicts in phantom an alternative configuration of the remote antenna assembly in which the modulating means is associated with the output from sense antenna 43 rather than loop antenna 44, with the output from the loop antenna being carried directly to the signal combining means 45 for combination with the modulated sense antenna output. As employed in the ADF art, the modulating means may comprise various circuit implementations which effect a periodic phase reversal of the RF input signal applied thereto at a low-frequency audio rate, with appropriate demodulating means in the receiver functioning to extract this low-frequency switching signal component, as it appears on the combined antenna signals, and compare its phase to that of the low-frequency switching signal source to recover a bearing definitive output signal.

In accordance with the present invention, this antenna signal modulating means is physically located in the antenna assembly, per se, as opposed to being located in the remote receiver. The critical interconnecting cables which have conventionally carried the sense and loop antenna outputs to the receiver unit are eliminated, and the signal combining means, located physically in the antenna assembly, may comprise any known state-of-the-art means for adding the low-frequency modulated output from one of the antenna means with the output from the other of the antenna means and provide a nominal output impedance matching that of a standard coaxial cable employed as the non-critical RF interconnection between the combining means in the remote antenna assembly and the remotely installed receiver unit.

As above described, the present invention provides for effectively moving the broad-band front end of the ADF receiver to the antenna assembly, with the latter including the loop antenna, sense antenna, signal commutator or modulating means, signal combiner and such broad-band preamplification as desired. Since the heretofore employed sense antenna cable, and its attendant voltage dividing affect has been eliminated, the present invention provides a means for attaining a desired sense antenna sensitivity with a sense antenna of much lower $H_e C_a$ product, and allows a small sense antenna to be integrated with the loop antenna in a common enclosure.

Figure 4:
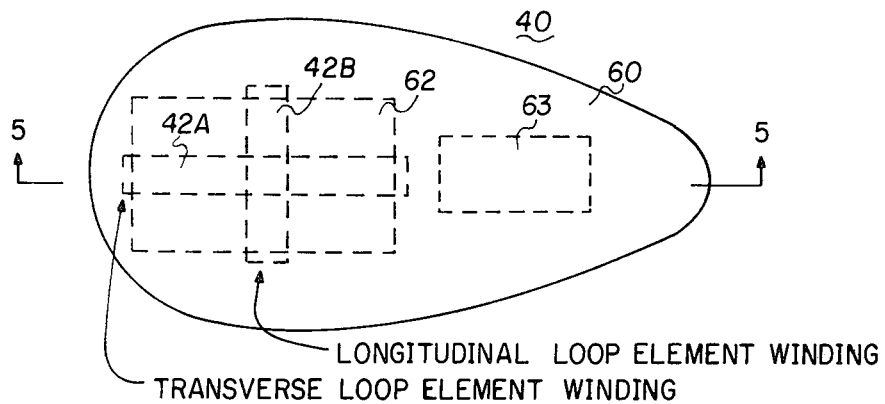
FIGS. 4 and 5 are respective plan and side elevation views illustrating assembly configuration concepts of the antenna assembly of the present invention.
Figure 5:
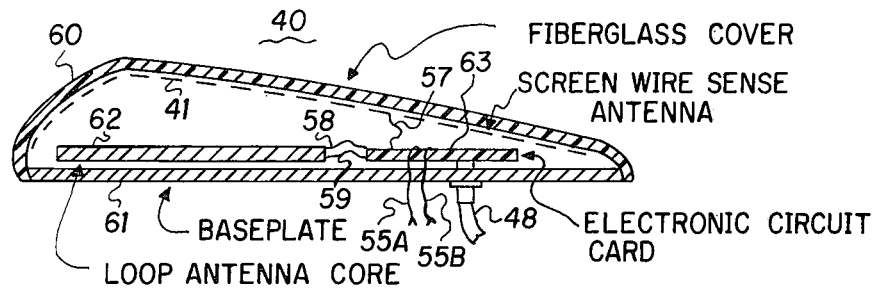

FIGS. 4 and 5 represent an exampled packaging concept of the small integrated antenna assembly realized by the present invention. FIG. 4, representing a plan view of the configuration, depicts the longitudinal and transverse loop element windings 42A and 42B as they might be wound on a common ferrite core member 62. The aforedescribed modulating means, preamplification means, and signal combining means would be embodied on a single electronic circuit card 63 carried within the assembly. As best depicted in FIG. 5, the assembly may be comprised of a base plate 61 on which the ferrite core member 62 and circuit card 63 are mounted. The longitudinal and transverse loop windings are indicated as being interconnected to circuit card 63 by means of short interconnections 58 and 59. A Fiberglass cover 60 of streamlined configuration might enclose the assembly, with a conductive material or screen wire sense antenna element 41 carried on, or embedded in, the Fiberglass cover 60. Sense antenna 41 is connected by a single interconnection 57 to the electronic circuit card 63. Coaxial cable 48 comprises the single RF interconnection between the assembly and the remote ADF receiver unit, while interconnections 55A and 55B carry the respective low frequency audio rate switching signals for application to the modulating means of the loop and sense antenna signal processing circuitries. The processing circuitries may be implemented by state-of-the-art solid state circuits on circuit card 63. Because of the reduced height configuration and capacitance requirement for the sense antenna made possible by the present invention, the comparatively small area sense antenna depicted in FIG. 5 provides the same sensitivity as heretofore-employed sense antennas of far greater $H_{eCa}$ requirement. The resulting antenna assembly is small, lightweight, compact, relatively inexpensive, and universally adaptable to installation on a wide variety of aircraft.

The present invention is seen to provide an improved ADF system concept, offering the advantages of simplified installation on airframe, elimination of requirement for special antenna cables, precise control of loop to sense signal ratios, co-location of loop and sense antenna for accuracy, applicability to all aircraft types, an amenability to implementations having no moving-part requirements, and a greatly reduced sense antenna physical size requirement.

Although the present invention has been described with respect to a particular embodiment thereof, it is not to be so limited, as changes might be made therein which fall within the scope of the present invention as defined in the appended claims.

What is claimed is:

1. In an automatic direction finding receiver system; an antenna unit integrally including a sense antenna means, a loop antenna means, modulating means to which the output of one of said antenna means is applied, and signal combining means receiving the output of said modulating means and the output of the other of said antenna means; a modulating signal source; a remote receiver unit including signal demodulating means responsive to the output of said signal combining means and the output of said modulating signal source to develop an output signal definitive of the bearing of a received signal; RF cable interconnect means between the output of said signal combining means and said receiver demodulating means with the output impedance of said signal combining means and the input impedance of said receiver demodulating means equalling the characteristic impedance of said cable interconnect means; and means connecting the output of said modulating signal source to said antenna assembly modulating means.

2. In an automatic direction finding receiver system of the type including an omnidirectional sense antenna, a directional loop antenna, means including a source of low-frequency switching signal for modulating the output from one of said sense antenna and loop antenna as a function of said low-frequency switching signal source, signal combining means combining the output of the modulated one of said antennas with the output of the other of said antennas, and demodulation means responsive to the switching modulation imposed on the output of said signal combining means to extract an output signal definitive of the bearing of a received signal; an antenna assembly comprising within a single integrated housing both said loop antenna and said sense antenna, said integrated antenna housing additionally comprising said signal modulating means and said signal combining means in which the output of said modulating means and the output of the unmodulated one of said antennas are additively combined, said signal combining means having a predetermined nominal output impedance; cable interconnect means carrying the output from said signal combining means to the demodulator means of said receiver system at a remote location, and means in said antenna assembly and said receiver demodulating means for terminating said cable interconnect means by the characteristic impedance thereof.

3. The system of claim 2 wherein said signal combining means produces a combined output that is phase modulated at said low-frequency switching signal rate and said receiver demodulation means comprises a phase detecting means responsive to said modulation signal and said output of said signal combining means to develop said output signal definitive of the bearing of said received signal.

4. The system of claim 2 wherein said signal combining means output produces an output signal amplitude modulated at said switching signal rate and said demodulation means of said receiver comprises amplitude detecting means responsive to said modulation signal and the output of said signal combining means to develop said output signal definitive of the bearing of the received signal.

5. The system of claim 2 wherein said signal combining means has a design output impedance equal that of the characteristic impedance of said cable interconnect means between said signal combining means and the demodulating means of said receiver, with said receiver demodulating means having a like input impedance.

6. The system of claim 2 with said loop antenna comprising first and second mutually orthogonal loop antenna elements, said modulating signal comprising first and second mutually phase displaced low-frequency signals, said signal modulating means comprising first and second balanced modulators respectively receiving the output of an associated different one of said loop antenna elements as a first input thereto and a respective one of said first and second phase displaced modulating signals as a second input thereto, with said signal combining means receiving the output of said sense antenna and the outputs of both of said balanced modulators as inputs thereto, said signal combining means additively combining the input signals thereto in circuitry the output impedance of which is nominally equal the characteristic impedance of said interconnect cable means.

7. The system of claim 6 further comprising in said antenna assembly, means to amplify the outputs of said sense antenna and each of said first and second loop antenna elements prior to the additive summation thereof in said signal combining means.

8. The system of claim 7 wherein said loop antenna elements comprise respective orthogonally oriented windings carried on associated ferrite cores the axes of which correspond with the respective longitudinal and transverse axes of a vehicle upon which said antenna assembly is mounted, and said sense antenna comprises a metallic ground insulated conductive element carried in immediate proximity to said loop antenna and connected to said signal combining means via a single wire connector.

9. The system of claim 8 wherein said loop antenna elements are mounted on a base plate attached to the body of said vehicle, a dielectric protective means enclosing said base plate and loop antenna element assembly, said metallic screen carried on the surface of said protective means, electronic circuit means comprising said modulating means and signal combining means housed within said assembly in immediate proximity to each of said loop and sense antennas and connected thereto by wire interconnections the respective lengths of which exhibit minimal capacitance over the range of frequencies of signals received by said antennas, with said base plate carrying an interconnect terminal to which said interconnect cable between said antenna assembly and said receiver is attachable.

* * * * *

UNITED STATES PATENT OFFICE
CERTIFICATE OF CORRECTION

PATENT NO. : 3,967,280
DATED : June 29, 1976
INVENTOR(S) : Abbott F. Mayer et al It is certified that error appears in the above-identified patent and that said Letters Patent are hereby corrected as shown below:

Column 6, line 66, delete the equation "$e_t = E_1 \cos\Theta \cos\omega in\ ct$" and substitute therefor --$e_t = E_1 \cos\Theta \cos\omega_c t$--.

Column 7, line 6, delete the equation "$e_{out} = E_s \sin\omega ct + E_1 E_m \cos\omega_c t \cos(\omega_m t\ \Theta)$" and substitute therefor
--$e_{out} = E_s \sin\omega ct + E_1 E_m \cos\omega_c t \cos(\omega_m t - \Theta)$--.

Column 7, line 10, delete "$+E_1 E_m \cos\omega_c t \cos(\omega_m t\ \Theta)$" and substitute therefor --$+E_1 E_m \cos\omega_c t \cos(\omega_m t - \Theta)$--.

Column 9, line 5, delete the equation "$H_{eCa}$" and substitute therefor --$H_e C_a$--.

Signed and Sealed this

Fourteenth Day of September 1976

[SEAL]

Attest:

RUTH C. MASON
*Attesting Officer*

C. MARSHALL DANN
*Commissioner of Patents and Trademarks*